Oct. 21, 1941.   R. ALKAN   2,259,600
AUTOMATIC STABILIZING ARRANGEMENT FOR AIRCRAFT
Filed Aug. 31, 1937   2 Sheets-Sheet 1
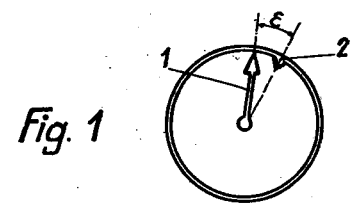
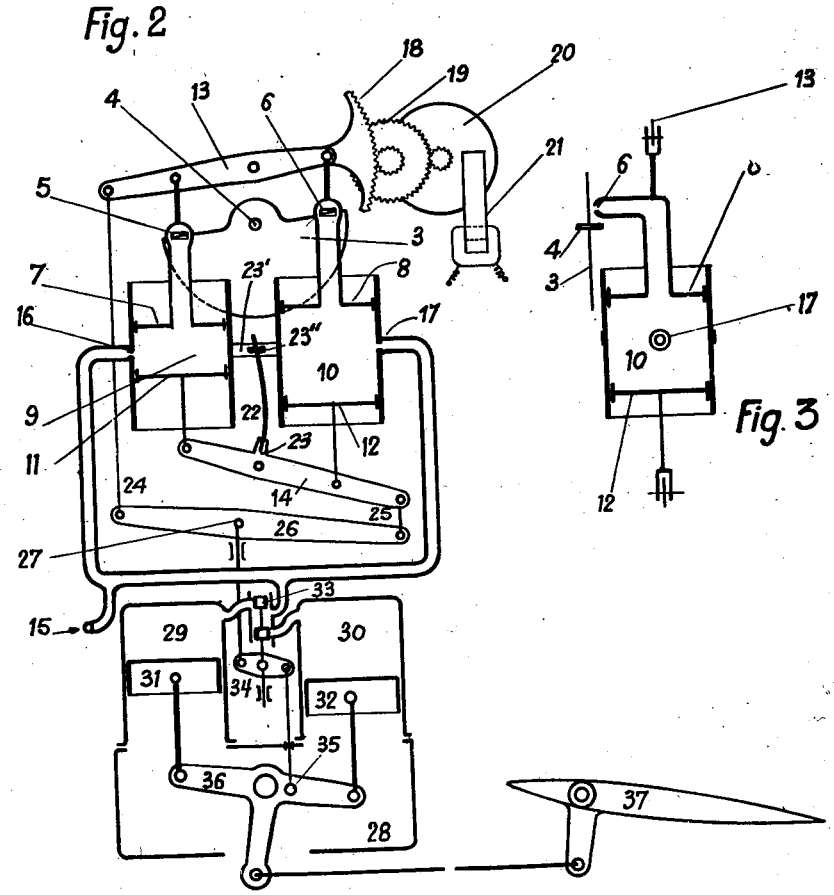
Inventor
Robert Alkan
By
Stephen Cerstvik
Attorney

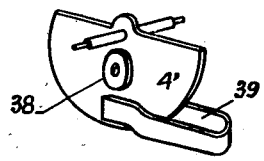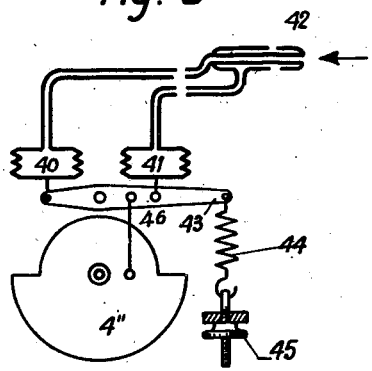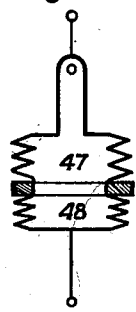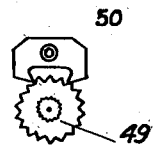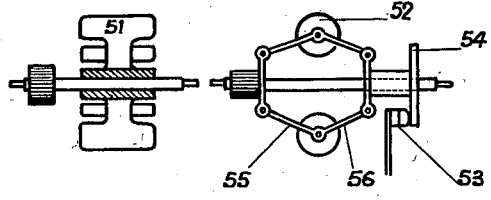

Patented Oct. 21, 1941

2,259,600

UNITED STATES PATENT OFFICE 2,259,600

AUTOMATIC STABILIZING ARRANGEMENT FOR AIRCRAFT

Robert Alkan, Paris, France

Application August 31, 1937, Serial No. 161,863
In France September 4, 1936

64 Claims. (Cl. 244—78)

This invention relates to automatic controls for dirigible craft and has for its object the provision of an improved device of this character.

It is well known that, in order to maintain automatically a craft such as an airplane in good conditions of stability relative to its three axes at right angles, i. e., axes of yawing, pitching and banking, the control surfaces of the plane must be deflected at every moment depending on casual angular movements of the plane about these axes.

It is also known that, in order to determine the displacements to be imparted to a control surface, one may liken, in a calm weather, the oscillations of the plane about the corresponding axis, to damped pendular oscillations. The stabilizing torque being produced by a deflection of this control surface, the angle of deflection must be at every moment equal to the algebraical sum of two terms, one of which, of the form $A\alpha$ proportional to the angle of deviation $\alpha$ of the craft from its position of equilibrium, produces the directive force and the other, of the form $$B\frac{d\alpha}{dt}$$

produces the damping force, A and B being coefficients depending on the characteristics of the plane.

In a bumpy weather, if one desires to maintain the plane in good conditions of stability about its three axes, the likening of its oscillations to simple damped pendular movements is no longer possible. In fact, under such conditions, the plane in its position of stability, for instance, may be subjected to violent, but short, bumps having the character of casual impacts, which impacts cannot be interpreted by the equation for simple pendular movement. For such cases, it is desirable to suitably deflect the corresponding control surface simultaneously with the perturbation, before a substantial deviation of the plane results from the perturbation. Therefore, the deflection of the control surface must be such as to produce, during a suitable time interval, an aerodynamic stabilizing torque depending on the casual angular acceleration, and the impulse resulting therefrom, during the time of application of this torque, should annihilate the perturbation as exactly as possible.

It is an object of this invention to provide a device for controlling automatically the action of a control surface such as a rudder, elevator, etc., of a dirigible craft whereby a more refined and accurate control is obtained than previously, taking into account the above explained desiderata.

With this object in view, the invention provides an improved device for controlling automatically a control surface of a dirigible craft depending on or responsive to the amplitude, the rate and the acceleration of angular movement of the craft about one or each of its axes.

In general, an automatic control system comprises for an axis of stability three essential parts:

(1) An apparatus serving to determine the direction of reference, which defines the axis of equilibrium which one desires to impose on the craft; this apparatus is generally a sensitive and delicate measuring instrument requiring but a very reduced quantity of energy for its operation.

(2) A servo-motor controlled by this apparatus and which is sufficiently powerful to operate the control surface of the craft.

(3) An intermediary mechanism operatively connecting the measuring instrument to the servo-motor and developing a power sufficient to actuate control means of this latter without substantially reacting on the measuring instrument.

In the device forming the object of the present invention, such an intermediary mechanism is conceived for insuring, on one hand a follow-up control between the movement of the measuring apparatus and the control means of the servo-motor, and on the other hand for measuring and materializing, in a simple way, the first and the second time derivatives of this movement and, finally, for controlling the movements of the servo-motor in response to the three terms $$\alpha, \frac{d\alpha}{dt} \text{ and } \frac{d^2\alpha}{dt^2}$$

The above and other objects and features of this invention will become apparent from the following detailed description and annexed drawings illustrating several embodiments of the invention. It is to be understood, however, that these drawings are for the purpose of illustration only and are not to be constructed as defining the limits of the invention, reference being had for this purpose to the appended claims.

In the drawings:

Figure 1 is a diagrammatic view showing the cooperation of a control index and a follow-up index;

Figure 2 is a sectional view of a pneumatically operated servo-motor assembly embodying the present invention.

Figure 3 is a partial section of a portion of the device of Fig. 2;

Figure 4 is a view in perspective of a control mechanism of the control element of the servo-motor device for the control of the ailerons insuring lateral stability of an airplane;

Figure 5 is an elevation of a control mechanism of the control element of a servo-motor device for the elevator insuring the longitudinal stability control of the airplane;

Figures 6, 7, 8 and 9 show different embodiments or modifications of certain details of the device.

In order to understand more easily the principle on which the device according to the invention is based, one can consider an elementary follow-up system comprising (Fig. 1) a sensitive pointer 1 connected to the measuring detector apparatus (directional gyroscope for instance in case of the directional control) and a follow-up index 2 actuated by a relay servo-motor not shown. If the follow-up control were perfect, there would be continuous and exact coincidence between index 1 and index 2 whatever might be the movement of the sensitive pointer. In practice, this exact coincidence exists only when the indexes are at rest. As soon as there is a displacement, there appears a lag angle ε between the two indexes causing a slight delay in the movement of the follow-up member 2.

In most of the known follow-up systems, this angle serves to control the power actuating the follow-up index. It will be noted that the power necessary, at every moment, for the operation of the relay servo-motor driving the follow-up index 2 depends on resistances this motor has to overcome. Now it is possible to arrange so that these resistances are not arbitrary, but substantially proportional to the speed and the acceleration of the movement of the index and practically independent of passive resistances of friction.

Thus, it would be possible to render the lag angle ε also proportional to these differential terms, but it will not be advisable to control directly the servo-motor of a control surface by the movement of the index 2 since, while the displacements of this index will be in fact at any moment functions of a trinomial of the form $$A\alpha + B \times \frac{d\alpha}{dt} + C \times \frac{d^2\alpha}{dt^2}$$

the sign of the differential terms in said expression is opposite to that which is suitable for a damped stabilisation and, therefore, these terms will act prejudicially and the arrangement will be liable of causing continuous oscillations of the plane and an increase of perturbations of its equilibrium.

According to this invention, these terms are usefully used to produce a damped stabilization.

Thus, the principle underlying the construction according to this invention consists in applying values proportional to the differential terms to the servo-motor, such values being applied in the proper direction thereby rendering useful and advantageous, for a damped stabilization, the differential terms which, in the known and conventional follow-up systems, appear inherently as having a perturbating and prejudicial effect.

According to the invention, this is obtained:

(1) By materializing these terms or the lag angle depending thereon at a suitable scale;

(2) By summing up these terms and combining them in a proper sense with terms proportional to the angle or amplitude of deviation determined by index 2;

(3) By controlling at every moment the movement of the servo-motor as a function of or in response to the sum of these three properly combined values.

Referring more particularly to Figures 2 to 9, Fig. 2 shows a complete device embodying the invention and capable of applications for controlling the airplane about any one of its axes.

The device comprises a disc 3 rotatable about an axis 4 and having a cut-out portion extending over a half of its circumference. This disc, which constitutes the control element of the device, is mounted for free rotation and receives its movement from the measuring apparatus (not shown) which gives the reference direction of stability.

The measuring apparatus may be constituted for instance by a directional gyroscope defining a reference direction in azimuth in case of an automatic control of the directional rudder, a damped pendulum defining the apparent vertical in case of an automatic control of the ailerons, and a differential air speed indicating manometer in case of an automatic control of the elevator, it being understood that any other instruments may be used for the same purpose.

This control disc is arranged to oscillate at a very slight distance in front of a pair of orifices 5 and 6 and is adapted in its neutral position to cover them partially and equally. These orifices are carried by a pair of fluid pressure operated pistons 7 and 8 and communicate through the hollow piston rods suitably arranged for this purpose with the interior of cylinders 9 and 10 within which these pistons reciprocate. These cylinders are fixed and comprise further two other pistons 11 and 12. The upper pistons 7 and 8 are connected to a rocking balance beam 13 and the lower pistons 11 and 12 to another balance beam 14. Fluid pressure is supplied at 15 for feeding equally and continuously the two cylinders 9 and 10 through the intermediary of two throttles or injectors 16 and 17 constituting a resistance.

The rocking beam 13, when angularly moved, drives with it a mechanism comprising a toothed sector 18, a multiplying speed gear mechanism 19 and a flying disc 20 braked by Foucault currents by means of an electromagnet 21.

The rocking beam 14 is restrained by a spring 22, having one end fixed at 23, and producing a restoring torque proportional to its deflection. This spring by opposing the movement of the beam 14 from its neutral position exerts thereon a centralizing action. As shown in a preferred embodiment, the spring is a leaf spring having one end rigidly fixed to the beam 14 and having its other end inserted slidably between two closely spaced stationary abutments in the form of pins 23' and 23".

The two rocking beams 13 and 14 are connected respectively by articulated rods or links 24 and 25 to a further rocking beam 26 pivoted about an axis 27 constrained to have a linear movement following the longitudinal axis of the whole device, which movement is thus proportional to the combined displacements of the two beams 13 and 14, so coordinated as to properly operate the control element of a servo-motor or power device actuating the control surface.

In so far as the movement of the follow-up system 5, 6, 7, 8, and 13 is concerned, this follow-up, excluding the effect of mechanism 18, 19, 20, and 21, transmits to the control valve of the servo-motor, an effect proportional to the amount of deviation of the craft less an amount depending upon the lag of the follow-up means. By utilizing the mechanism 18, 19, 20, and 21, the lag angle, instead of having an arbitrary value, is modified so as to be dependent upon the speed and acceleration of movement of the follow-up and hence the speed and acceleration of the deviation of the craft. Thus the effect transmitted to the control valve of the servo-motor is made proportional to the amount of deviation of the craft, less a certain amount proportional to a lag angle which is made proportional to the speed and acceleration of the movement. If no other means are utilized, the system would be unsatisfactory, since the lag would be increased instead of decreased as is desired. Pistons 11 and 12, however, measure the differential pressure in cylinders 9 and 10, which pressure is proportional to the lag angle between the disc 3 and the follow-up means 5, 6, 7, 8, and these pistons therefore produce an effect on the control valve of the servo-motor opposite to that of the lag by transmitting a force by means of beam 14, link 15, and beam 26, which force is thereby properly applied to produce an effect combining with the effect produced by the follow-up means. A conventional follow-up control is preferably provided between said surface and the control member of the servo-motor. As shown in the drawings, the deflection of a control surface is effected with the necessary power by a servo-motor device 28 comprising two fluid-pressure operated pistons 31, 32, connected to the controls of the corresponding surface 37, which pistons are mounted for movement in two fixed cylinders 29 and 30 supplied with fluid under pressure through the intermediary of a conventional position follow-up control mechanism operated by the pivot 27 on the beam 26 and comprising an equilibrated slide valve 33 controlled by a rocking lever 34 connected by articulated rods, on one hand to the pivot 27 on the beam 26 and on the other hand to an axis 35 on the control bar of the control surface.

The operation of the device is as follows: Pistons 7 and 8 form with the disc 3 an intermediary follow-up mechanism, the orifices 5 and 6 being caused to follow-up the displacements of the edges of the cut-out portion of the disc 3. In fact, the pressure within cylinders 9 and 10 depends essentially on the degree of closure or opening of orifices 5 and 6, and the device seeks by itself a position in which said orifices 5 and 6 are exactly half-covered, whereupon the pressure in both cylinders 9 and 10 is equal.

If pistons 7 and 8 had no substantial resistance to overcome, the pressures in the two cylinders would always remain substantially equal, the orifices 5 and 6 following faithfully the control edges of the disc and thus maintaining without substantial changes their state of half closure. However, according to the invention, the movement of the pistons 7 and 8 is opposed by the mechanism 18, 19, 20 which is adapted to build up a resistant torque to this movement, which is depending on the speed and the acceleration of said movement. Thus, the rocking lever 13, as it is displaced by pistons 7 and 8, drives the mechanism 18, 19, 20 which opposes the movement of the pistons with a force which is the sum of two terms, one depending on the speed of said movement and which results from the induction of eddy currents in the disc 20, which may be regulated by varying the energizing current of the electromagnet, and the other depending on the acceleration of said movement and resulting from the inertia of masses of various parts moving with or forming a part such as the flying disc 20 of the retarding mechanism 18, 19, 20.

Thus, owing to the provision of said retarding mechanism, the two orifices 5 and 6 cannot follow the movement of the control disc to stay exactly half-covered thereby, and the dissymmetry in the degree of closure of these orifices, adjusting itself automatically at any moment, produces within the two cylinders 9 and 10 a difference in pressure which is proportional to the value of said decelerating forces or effects depending on the speed and acceleration of the movement, and which may be taken thus as a measure of the sum of the two differential terms wanted. In other words, the lag angle of the follow-up means is made proportional to the speed and acceleration of the movement of said means and a difference in pressure is produced proportional to the lag angle.

A very convenient manner of measuring this difference in pressure consists in measuring or materializing it by displacement of pistons 11 and 12, which constitute practically, with rocking beam 14 and spring 22, a manometeric device.

The lag angle is thereby measured and a force proportional to said lag angle is applied with proper sign, to the servo-motor. It is noted that the follow-up means applies its effect to one end of rocking beam 26 while a force which is a measurement of the lag angle in terms of rate and acceleration is applied to the other end of rocking beam 26, thereby introducing a controlling effect of proper sign to the servo-motor, to overcome the inherent lag and the artificial lag of the follow-up means. Stated differently, as the speed of disc 20 is increased, the lag of beam 13 increases proportionally, producing thereby a proportional increase in the differential pressure in the cylinders 9 and 10 and thereby causing a greater movement of beam 14 against the retardation of spring 22, which beam 14 by applying its movement to that end of beam 26 opposite to that to which the movement of beam 13 is applied, thereby produces an increase in the rate of correction applied to the servo-motor which increase in the rate of correction is thereby also applied to the control surface. There is applied, therefore, to the servo-motor and to the control surface, a force which not only compensates for the lag but also a force proportional to the speed and acceleration of deviation or to the rate of change of lag and to the second differential of said lag, since the lag is a function of the deviation.

As indicated above, the rocking beam 26 serves to sum up the displacements of rocking beams 13 and 14 and as the movement of beam 13 is otherwise very substantially proportional to the amplitude of the deviation of the craft, the control imposed on the servo-motor, and hence on the control surface, by means of the follow-up mechanism 33, 34, 35, controlling the servo-motor 28, is proportional to the sum of the three terms wanted, namely the amplitude, the rate and the acceleration of angular movement of the craft.

Figure 4 shows an application of a device according to the invention to the control of ailerons. In this case, the whole of the device is in all points similar to that of Figure 2, but the control disc 4' is made to constitute in itself a measuring instrument. Thus, this disc is suitably unbalanced by means of an additional mass 38 to constitute a composed sensitive pendulum suitable to define with precision the apparent vertical which may serve as a reference line for the transversal equilibrium. This pendulum may be completed with a damping device constituted, for instance, by a permanent magnet 39 between the branches of which the disc 4' is caused to rotate.

Figure 5 shows an application of the device according to the invention to the control of the elevator. In this case, the device which is in all points similar to that of Figure 2, may have a disc 4'' actuated by a differential manometer constituted by two capsules or bellows, 40, 41, connected by two tubes to an air speed measuring device 42. The bellows or capsules are connected to a rocking beam 43 pivoted with great care and subjected to the action of a restraining spring 44 adjustable by means of a nut 45. The rocking bar 43 transmits its movement by a link 46 to the disc 4''; the angular movements of this latter, for small changes in the air speed relative to a predetermined imposed value of said speed, are substantially proportional to these changes.

It will be noted that, in case of application of such a control to the elevator, the elements intervening in the determination of the angle of deflection to be imposed on the control surface will be at every moment: the extent of relative change in the airspeed of the craft with respect to a predetermined imposed value of such speed as well as the rate and the acceleration of this change. These first two terms correspond, in case of a flight with constant R. P. M. of the engine, the first to the acceleration following the longitudinal axis of the craft, which acceleration depends upon the pitch angle, the second to the variation of this pitch angle. These terms are materialized in this device by means of relatively simple and light members without the use of any gyroscopic devices of difficult and delicate structure and adjustment.

Figure 6 shows a different form of construction of a fluid pressure operated means of the device, which may be constituted as shown in said figure by elastic chambers or bellows 47, 48, made of a very deformable material such as rubber, instead of rigid pistons and cylinders as shown in Figure 2. This arrangement presents the advantage of suppressing friction between the pistons and cylinders, as well as of eliminating annular leaks which may constitute if the finishing of the parts is not perfect, sources of important errors in the determination of elements to be measured by devices such as 9 and 10 made in accordance with Figure 2.

As indicated above, one of the important features of this invention resides in the provision of means for retarding or controlling the movement of a follow-up control, operated by the measuring instrument, so as to make the lag angle in said control proportional or dependent on the rate and the acceleration of the movement. This was obtained in Figure 2 by a Foucault current brake applied to a disc rotated by the follow-up member 13. It is understood however that any other arrangement may be used for this purpose, provided it gives a resistant torque depending on the rate and acceleration of its actuation.

Thus, Figure 7 shows a modification of the mechanism producing a resistant force depending on the rate of movement. In this modification, the disc with eddy currents is replaced by an escapement wheel 49 of a clockwork type with a non-isochronous flapping anchor 50 giving a resistant torque which increases as a function of the speed of the wheel 49.

Figure 8 shows another embodiment of the retarding mechanism for the follow-up control means operated by a reference measuring device. In this modification, the disc 20 of Figure 2 is replaced by a fan 51 which, in its rotation, is braked by the resistance of the air which increases in function of the speed.

In both these modifications, the inertia of moving masses gives a function depending on the acceleration.

Figure 9 shows a still further embodiment of the retarding mechanism for opposing the movement of the follow-up control means operated by a reference measuring instrument. In this modification, the disc 20 of Figure 2 is replaced by a frictional centrifugal regulator. Upon rotation, this regulator produces simultaneously by its masses, such as 52, the inertia forces which are wanted and a resistant torque which increases as a function of the speed as a result of the friction occurring between a fixed shoe 53 and a collar 54, which latter, as a result of the articulation of the system, is applied against the shoe 53 with a pressure proportional to the centrifugal forces.

The invention thus provides an improved device for automatically controlling a control surface of a dirigible craft in response to the amplitude, the rate and the acceleration of deviations of the craft from its equilibrium position about a given axis and comprising a reference measuring apparatus, a servo-motor actuating the control surface and an intermediary control mechanism operatively interconnecting the first two devices. This intermediary mechanism is adapted to cause the control means of the servo-motor or power device actuating the control surface to follow-up the movement of the measuring apparatus, to permit automatically to measure and to materialize simply the two differential terms of the deviation by summing them up in a proper direction with a term depending on the amplitude of deviation, and to impose on the control means of the servo-motor or power device actuating the control surface, a control depending on the sum of these three terms. This intermediary mechanism is using for its operation a fluid pressure and the materialisation of the differential terms is obtained by causing the movement of the follow-up means of the sensitive instrument to be opposed by a resistant force made dependable on the speed and acceleration of the movement of said means and determining, by means of a manometric measure, the operating pressure actuating at any moment the follow-up means, which pressure is proportional to said resistant force and is produced as a result of the automatic variation of the lag of said follow-up means relative to the reference measuring device, this lag regulating the operating pressure.

While, in accordance with the provision of the patent statutes, the invention has been herein described in its principle and operation, together with several embodiments thereof, it is to be understood that the embodiments shown are only illustrative and that the invention can be carried out by other means. Thus, while the embodiments described herein shown the use of fluid under pressure for the operation of the whole system, it is understood that a depression or vacuum forces may be used instead of pressure forces for the operation of the system, or the intermediary mechanism may be made to operate on depression and the servo-motor on fluid under pressure. Furthermore, it is understood that the invention is capable of application to the control of any control surface of a dirigible craft from any kind of reference measuring device which it may be desired to use for controlling a given control surface. Also, while it is designed to use the various features and elements in the combination and relations described, some of these may be altered and others omitted, all within the scope of the invention.

What is claimed is:

1. An automatic control system for a dirigible craft comprising a control surface, a reference measuring apparatus, a servo-motor device for controlling said surface, control means for said servo-motor device and means including a follow-up control means between said reference measuring apparatus and said control means for the servo-motor, permitting to materialize the two first differential terms of movement of said follow-up means and to introduce them with a proper sign into the control of the servo-motor control means to make this control means responsive to the amplitude, the rate and the acceleration of relative deviations of the craft from a state of equilibrium relative to a given axis thereof, registered by said reference measuring apparatus.

2. An automatic control system for a dirigible craft comprising a control surface, a reference measuring apparatus, a servo-motor device for controlling said surface, control means for said servo-motor device and means including fluid pressure operated follow-up control means between said reference measuring apparatus and said control means for the servo-motor, permitting to materialize the two first differential terms of movement of said follow-up means and to introduce them with a proper sign into the control of the servo-motor control means to make this control means responsive to the amplitude, the rate and the acceleration of relative deviations of the craft from a state of equilibrium relative to a given axis thereof, registered by said measuring apparatus.

3. An automatic control system for a dirigible craft comprising a control surface, a reference measuring apparatus, a servo-motor device for controlling said surface, control means for said servo-motor device and means between said reference measuring apparatus and said servo-motor control means, comprising follow-up control means operatively interconnecting said measuring apparatus and said servo-motor control means, means opposing the movement of said follow-up means with a force depending on the speed and acceleration of the movement thereof and means measuring at every moment the operating power of said follow-up means variable with the lag angle of said follow-up means relative to the measuring apparatus, and means additively controlled by said follow-up means and said measuring means, for the operating power of said follow-up control means, for controlling the servo-motor control means in response to the amplitude, the speed and the acceleration of relative deviations of the craft from a state of equilibrium relative to a given axis thereof, registered by said reference measuring apparatus.

4. An automatic control system for a dirigible craft comprising a control surface, a reference measuring apparatus, a servo-motor device for controlling said surface, control means for said servo-motor device and means between said reference measuring apparatus and said servo-motor control means comprising fluid pressure-operated follow-up control means operatively interconnecting said measuring apparatus and said servo-motor control means, means opposing the movement of said follow-up means with a force depending on the speed and the acceleration of the movement thereof and means measuring at every moment the operating fluid pressure of said follow-up means variable with the lag angle of said follow-up means relative to the measuring apparatus, and means additively controlled by said follow-up means and said measuring means for the operating power of said follow-up control means, for controlling the servo-motor control means in response to the amplitude, the speed and the acceleration of relative deviations of the craft from a state of equilibrium relative to a given axis thereof, registered by said reference measuring apparatus.

5. An automatic control system for a dirigible craft comprising a control surface, a reference measuring apparatus, a servo-motor device for controlling said surface, control means for said servo-motor device and means between said reference measuring apparatus and said servo-motor control means comprising pneumatically operated follow-up control means operatively interconnecting said measuring apparatus and said servo-motor control means, means opposing the movement of said follow-up means with a force depending on the speed and the acceleration of the movement thereof, and means measuring at every moment the operating pneumatic pressure of said follow-up control means variable with the lag angle of said follow-up means relative to the measuring apparatus, and means additively controlled by said follow-up means and said measuring means for the operating power of said follow-up control means for controlling the servo-motor control means in response to the amplitude, the speed and the acceleration of relative deviations of the craft from a state of equilibrium relative to a given axis thereof, registered by said reference measuring apparatus.

6. An automatic control system for a dirigible craft, comprising a control surface, a reference measuring apparatus, a servo-motor device for controlling said surface, control means for said servo-motor device and means including a fluid pressure operated follow-up control means between said reference measuring apparatus and said servo-motor control means for controlling said servo-motor device in response to the amplitude, the speed and the acceleration of deviations of the craft from a position of equilibrium relative to a given axis thereof, registered by said reference measuring apparatus, said means comprising two fluid pressure operated devices interconnected for opposite synchronous movement and adapted to be controlled differentially by said measuring apparatus, varying the operating pressure in said devices, to follow-up the movement of said measuring apparatus, means for opposing a retarding force to the movement of said fluid pressure operated devices, proportionally to the speed and the acceleration of this movement, pressure measuring means for measuring the operating pressure difference between said two devices, depending on the lag occurring in the movement thereof relative to the reference measuring apparatus and proportional, as a result of the action of said retarding means, to the speed and the acceleration of the deviation, and means operatively connected to the servo control means and adapted to be additively controlled by the movement of said fluid pressure operated devices and pressure measuring means.

7. An automatic control device for a dirigible craft, comprising a control surface, a reference measuring apparatus, a servo-motor device for controlling said surface, control means for said servo-motor device and means including a fluid pressure operated follow-up control means between said reference measuring apparatus and said servo-motor control means for controlling said servo-motor device in response to the amplitude, the speed and the acceleration of deviations of the craft from a position of equilibrium relative to a given axis thereof, registered by said reference measuring apparatus, said means comprising a control member actuated by the reference measuring apparatus, two pistons interconnected for opposite synchronous movement and reciprocating in two cylinders having a permanent restricted communication with a fluid pressure supply on one side of said pistons, hollow piston rods on said pistons provided with orifices communicating with the pressure side of said pistons and controlled differentially by said control member of the reference measuring apparatus, whereby the pistons are caused to follow-up directly the movement of said control member, means for opposing a retarding force to the movement of said pistons proportionally to the speed and the acceleration of this movement, pressure measuring means for measuring the operating pressure difference between the two cylinders depending on the lag occurring in the movement of said pistons relative to the control member of the measuring apparatus and proportional, as a result of said retarding means, to the speed and the acceleration of the deviation, and means operatively connected to the servo-motor control means and adapted to be additively controlled by the movement of said pistons and said pressure measuring means.

8. An automatic control device for a dirigible craft comprising a control surface, a reference measuring apparatus, a servo-motor device for controlling said surface, control means for said servo-motor device and means including a fluid pressure operated follow-up control means between said reference measuring apparatus and said servo-motor control means for controlling said servo-motor device in response to the amplitude, the speed and the acceleration of deviations of the craft from a position of equilibrium relative to a given axis thereof, registered by said reference measuring apparatus, said means comprising a control member actuated by the reference measuring apparatus, two pistons interconnected for opposite synchronous movement and reciprocating in two cylinders having a permanent restricted communication with a fluid pressure supply on one side of said pistons, hollow piston rods on said pistons provided with orifices communicating with the pressure side of said pistons and controlled differentially by said control member of the reference measuring apparatus, whereby the pistons are caused to follow-up directly the movement of said control member, means for opposing a retarding force to the movement of said pistons proportionally to the speed and the acceleration of this movement, pressure measuring means including two further pistons mounted to reciprocate in the same cylinders in opposition to the follow-up pistons, for measuring pressure difference between the two cylinders depending on the lag occurring in the movement of said pistons relative to the control member of the measuring apparatus and proportional, as a result of said retarding means, to the speed and the acceleration of the deviation, and means operatively connected to the servo-motor control means and adapted to be additively controlled by the movement of said pistons and said pressure measuring means.

9. An automatic control system for a dirigible craft, comprising a control surface, a reference measuring apparatus, a servo-motor device controlling said surface, control means for said servo-motor device and means including a fluid pressure operated follow-up control means, between said reference measuring apparatus and said servo-motor control means for controlling said servo-motor device in response to the amplitude, the speed and the acceleration of deviations of the craft from a position of equilibrium relative to a given axis thereof registered by said reference measuring apparatus, said means comprising two fluid pressure operated bellows interconnected at one end for opposite synchronous movement and fixed at the other end, fluid pressure supply means having a permanent restricted communication with the inside of said bellows, a hollow piston rod on each bellows provided with an orifice communicating with the interior of said bellows, a control member actuated by said reference measuring apparatus and controlling differentially said orifices, whereby the bellows are caused to follow-up the movement of said control member, means for opposing a retarding force to the movement of said bellows proportionally to the speed and the acceleration of this movement, pressure measuring means for measuring the operating pressure difference between the two bellows, depending on the lag occurring in the movement of said bellows, relative to the control member of said reference measuring apparatus and proportional, as a result of action of said retarding means, to the speed and the acceleration of the deviation, and means operatively connected to the servo-motor control means and adapted to be additively controlled by the movement of said bellows and said pressure measuring means.

10. An automatic control system for a dirigible craft, comprising a control surface, a reference measuring apparatus, a servo-motor device controlling said surface, control means for said servo-motor device and means including a fluid pressure operated follow-up control means, between said reference measuring apparatus and said servo-motor control means for controlling said servo-motor device in response to the amplitude, the speed and the acceleration of deviations of the craft from a position of equilibrium relative to a given axis thereof registered by said reference measuring apparatus, said means comprising two fluid pressure operated bellows interconnected at one end for opposite synchronous movement and fixed at the other end, fluid pressure supply means having a permanent restricted communication with the inside of said bellows, a hollow piston rod on each bellows provided with an orifice communicating with the interior of said bellows, a control member actuated by said reference measuring apparatus and controlling differentially said orifices, whereby the bellows are caused to follow-up the movement of said control member, means for opposing a retarding force to the movement of said bellows proportionally to the speed and the acceleration of this movement, pressure measuring means including two further bellows mounted in opposition to and communicating interiorly with said first bellows, for measuring the operating pressure difference between the first two bellows depending on the lag occurring in the movement of said bellows relative to the control member of said reference measuring apparatus and proportional, as a result of action of said retarding means, to the speed and the acceleration of the deviation, and means operatively connected to the servo-motor control means and adapted to be additively controlled by the movement of said follow-up bellows and said pressure measuring bellows.

11. An automatic control system as in claim 6, wherein the follow-up fluid pressure operated devices and pressure measuring means are actuating respectively two balance rocking beams pivoted about fixed points and connected to opposite extremities of a further balance rocking beam pivoted about a point constrained to move linearly and connected to the servo-motor control means, the first two balance beams being further adapted respectively, one operated by the follow-up means to drive the retarding means opposing the movement of the follow-up means and the other, operated by pressure measuring means, to resiliently restrain the movement of said pressure measuring means to make the movement thereof proportional to the operating pressure of said follow-up means.

12. An automatic control system as in claim 1, wherein a conventional follow-up connection is further provided between the servo-motor control means and the movement of the control surface operated by the servo-motor device.

13. An automatic control system as in claim 3, wherein a conventional follow-up connection is further provided between the servo-motor control means and the movement of the control surface operated by the servo-motor device.

14. An automatic control system as in claim 6, wherein a conventional follow-up connection is further provided between the servo-motor control means and the movement of the control surface operated by the servo-motor device.

15. An automatic control system as in claim 3, wherein means for opposing the movement of the follow-up means, between the reference measuring apparatus and the control means of the servo-motor, in response to the speed and the acceleration of the movement of the same comprise a Foucault current brake applied to a disc rotated by said follow-up means.

16. An automatic control system as in claim 3, wherein means for opposing the movement of the follow-up means, between the reference measuring apparatus and the control means of the servo-motor, in response to the speed and the acceleration of the movement of the same comprise an escapement mechanism giving a resistant torque increasing with the speed of its actuation and comprising an escapement wheel driven by the follow-up means and a non-isochronous flapping anchor cooperating therewith.

17. An automatic control system as in claim 6, wherein means for opposing the movement of the follow-up means, between the reference measuring apparatus and the control means of the servo-motor, in response to the speed and the acceleration of the movement of the same comprise an escapement mechanism giving a resistant torque increasing with the speed of its actuation and comprising an escapement wheel driven by the follow-up means and a non-isochronous flapping anchor cooperating therewith.

18. An automatic control system as in claim 10, wherein means for opposing the movement of the follow-up means, between the reference measuring apparatus and the control means of the servo-motor, in response to the speed and the acceleration of the movement of the same comprise an escapement mechanism giving a resistant torque increasing with the speed of its actuation and comprising an escapement wheel driven by the follow-up means and a non-isochronous flapping anchor cooperating therewith.

19. An automatic control system is in claim 3, wherein means for opposing the movement of the follow-up means, between the reference measuring apparatus and the control means of the servo-motor, in response to the speed and the acceleration of the movement of the same comprise a fan driven by the follow-up means and giving as a result of air reaction during rotation a resistance increasing as a function of the speed.

20. An automatic control system as in claim 3, wherein means for opposing the movement of the follow-up means, between the reference measuring apparatus and the control means of the servo-motor, in response to the speed and the acceleration of the movement of the same, comprise a centrifugally operated brake mechanism actuated by the follow-up means.

21. An automatic control system as in claim 6, wherein the control member operated by the measuring apparatus and controlling the follow-up means providing a control responsive to the amplitude, the speed and the acceleration of the deviation, is constituted by a disc having two diametrically opposed controlling edges and rotatable about an axis midway between two orifices constrained to have parallel linear movements on either side of said axis, depending on the relative covering thereof by said control edges of the disc.

22. An automatic control system as in claim 10, wherein the control member operated by the measuring apparatus and controlling the follow-up means providing a control responsive to the amplitude, the speed and the acceleration of the deviation, is constituted by a disc having two diametrically opposed controlling edges and rotatable about an axis midway between two orifices constrained to have parallel linear movements on either side of said axis, depending on the relative covering thereof by said control edges of the disc.

23. An automatic control system for the stability of an aircraft about an axis in dependency of the apparent vertical direction comprising an automatic control device as in claim 6, wherein the control member is made to constitute in itself a measuring instrument, being formed by a semi-circular disc suitably unbalanced to constitute a gravity pendulum, this disc being adapted to control by altering the relative coverage of two orifices linearly moving on either side of the axis of rotation of said disc, the follow-up means of said automatic control device, providing a control responsive to the amplitude, the speed and the acceleration of the deviation.

24. An automatic control system for the longitudinal stability of an aircraft, depending on the relative speed of the craft with respect to the surrounding air, comprising in combination an automatic control device according to claim 6 and an air speed measuring device having its branches of dynamic and static pressures connected to a differential pressure measuring device adapted to actuate the control member of said automatic control device providing a control responsive to the amplitude, the speed and the acceleration of the deviation.

25. An automatic steering system for controlling a craft about its vertical axis comprising in combination a steering rudder, an automatic control device according to claim 6 for controlling said rudder and a directional or azimuth gyroscope connected to the control member of said automatic control device to control the same, whereby the rudder is controlled directly from a fixed position reference apparatus in response to the amplitude, the speed and the acceleration of deviations of the craft from a fixed reference given by said apparatus.

26. An automatic control system for a dirigible craft comprising a control surface, a reference measuring apparatus, a servo-motor device for controlling said surface, control means for said servo-motor, and means including a follow-up control means between said reference measuring apparatus and said control means for the servo-motor device for controlling said servo-motor device in response to the amplitude, the speed and the acceleration of deviations of the craft from a state of equilibrium relative to a given axis thereof, registered by said reference measuring apparatus, and a conventional follow-up connection between the servo-motor control means and the control surface.

27. An automatic control system for a dirigible craft comprising a control surface, a reference measuring apparatus, means responsive to the amplitude of deviations of the craft from a state of equilibrium relative to a given axis thereof, registered by said measuring apparatus, means controlled by said deviation responsive means producing a force proportional to the speed of deviation, means producing a force proportional to all values of the acceleration of deviation, and means responsive to all of said means for controlling said surface.

28. An automatic control system for a dirigible craft comprising a control surface for controlling said craft with respect to a desired axis, means responsive to the deviation of said craft about said axis, means controlled by said deviation responsive means producing a force proportional to the rate of deviation, and means controlled by said deviation responsive means producing a force proportional to all values of acceleration of deviation about said axis, said means controlling said surface.

29. An automatic control system for a dirigible craft comprising a control surface, a reference measuring apparatus, means responsive to the amplitude of deviations of the craft from a state of equilibrium relative to a given axis thereof, registered by said measuring apparatus, and means controlled by said deviation responsive means producing a force proportional to all values of the acceleration of deviation, said deviation responsive means and said acceleration means controlling said surface.

30. An automatic control system for a dirigible craft comprising a control surface, a reference measuring apparatus, means responsive to the amplitude of deviations of the craft from a state of equilibrium relative to a given axis thereof, registered by said measuring apparatus, means deriving from said amplitude responsive means the first differential of said deviation, means for deriving from said amplitude responsive means the second differential of said deviation and means responsive to said deviation means and said first and second differential means for controlling said craft.

31. An automatic control system for dirigible craft comprising a control surface, a reference measuring apparatus, means responsive to the amplitude of deviations of the craft from a state of equilibrium relative to a given axis thereof, registered by said measuring apparatus, means deriving from said amplitude responsive means the first differential of said deviation, means producing a force proportional to the second differential of said deviation and means responsive to said deviation means, said first differential means and said second differential means for controlling said surface.

32. An automatic control system for dirigible craft comprising a control surface, a reference measuring apparatus, means responsive to the amplitude of deviations of the craft from a state of equilibrium relative to a given axis thereof registered by said measuring apparatus, means deriving from said amplitude responsive means the second differential of all values of said deviation and means responsive to said deviation means and to said second differential means for controlling said surface.

33. An automatic control system for a dirigible craft comprising a control surface, a reference measuring apparatus, a servo-motor device for controlling said surface, follow-up control means between said reference measuring apparatus and said servo-motor, and means for deriving the first differential of the movement of said follow-up means and to introduce it with proper sign into the control of the servo-motor, whereby said servo-motor is controlled in response to the amplitude and rate of deviation of the craft from a state of equilibrium relative to a given axis thereof, registered by said measuring apparatus.

34. An automatic control system for a dirigible craft comprising a control surface, a reference measuring apparatus, a servo-motor device for controlling said surface, follow-up control means between said reference measuring apparatus and said servo-motor, and means for deriving the second differential of the movement of said follow-up means and to introduce it with proper sign into the control of the servo-motor, whereby said servo-motor is controlled in response to the amplitude and acceleration of deviation of the craft from a state of equilibrium relative to a given axis thereof, registered by said measuring apparatus.

35. An automatic control system for a dirigible craft comprising a control surface, a reference measuring apparatus, a servo-motor device for controlling said surface, follow-up control means between said reference measuring apparatus and said servo-motor and a second follow-up control means between said control surface and said servo-motor.

36. An automatic control system for a dirigible craft comprising a control surface, a reference measuring apparatus, a servo-motor device for controlling said surface, control means for said servo-motor device and means between said reference measuring apparatus and said servo-motor control means comprising follow-up control means operatively interconnecting said measuring apparatus and said servo-motor control means, means opposing the movement of said follow-up means with a force depending on the speed and acceleration of the movement of the craft and means controlled by said follow-up means and said measuring means for controlling the servo-motor control means, whereby said craft is controlled in response to the amplitude, speed and acceleration of relative deviation thereof, from a state of equilibrium relative to a given axis thereof registered by said reference measuring apparatus.

37. An automatic control system for a dirigible craft comprising a control surface, a reference measuring apparatus, a servo-motor device for controlling said surface, and follow-up control means between said reference measuring apparatus and said servo-motor, said follow-up means including a disc rotating in a magnetic field.

38. An automatic control system for a dirigible craft comprising a control surface, a reference measuring apparatus, a servo-motor device for controlling said surface, and follow-up control means between said reference measuring apparatus and said servo-motor, said follow-up means including an escapement mechanism providing a resistant torque, increasing with the speed of its actuation.

39. An automatic control system for a dirigible craft comprising a control surface, a reference measuring apparatus, a servo-motor device for controlling said surface, and follow-up control means between said reference measuring apparatus and said servo-motor, said follow-up means including a fan rotatably driven thereby.

40. An automatic control system for a dirigible craft comprising a control surface, a reference measuring apparatus, a servo-motor device for controlling said surface, and follow-up control means between said reference measuring apparatus and said servo-motor, said follow-up means including a centrifugally operated brake mechanism operated thereby.

41. An automatic control system for a dirigible craft comprising a control surface, a speed measuring device, a servo-motor device for controlling said surface, control means for said servo-motor device and means between said reference measuring apparatus and said servo-motor control means comprising follow-up control means operatively interconnecting said speed measuring apparatus and said servo-motor control means, means opposing the movement of said follow-up means with a force depending upon the rate of change of speed and the acceleration of the craft, and means controlled by said follow-up means for controlling the servo-motor control means whereby said craft is controlled in response to the speed, rate of change of speed and acceleration of said craft.

42. In an automatic pilot for dirigible craft having a rudder, the combination of a servo-motor for actuating said rudder, means for controlling said servo-motor, direction responsive means mounted for relative turning about a vertical axis, a two-part means for actuating said controlling means upon relative turning of the direction means about said vertical axis, one of said parts being controlled by said direction means and the other part being connected to said controlling means, means whereby one of said parts follows the movement of the other part during actuation of said controlling means, and a follow-up connection between said rudder and said controlling means.

43. In an automatic pilot for dirigible craft having a rudder, the combination of a servo-motor for actuating said rudder, means for controlling said servo-motor, direction responsive means mounted for relative turning about a vertical axis, a two-part means for actuating said controlling means upon relative turning of the direction means about said vertical axis, one of said parts being controlled by said direction means and the other part being connected to said controlling means, means whereby one of said parts follows the movement of the other part during actuation of said controlling means, and a follow-up connection between said rudder and said controlling means and means for modifying the action of said two-part means on said controlling means in accordance with the rate of deviation of the craft and in accordance with the acceleration of said craft, whereby the rudder is actuated by the servo-motor as a function of the amount, rate and acceleration of deviation of the craft.

44. In an automatic pilot for dirigible craft, the combination of a rudder, direction responsive means, a pair of air ports mounted adjacent thereto and adapted to provide parallel air streams in the same direction, an intercepting plate connected to said direction responsive means adjacent but out of contact with said ports and rotatable in a plane at right angles to said ports, differential pressure responsive means controlled by said ports and so arranged that upon actuation thereof said ports are caused to follow the movements of said intercepting plate, a servo-motor for actuating the rudder, means actuated by said differential pressure responsive means for controlling said servo-motor, and a follow-up connection from said rudder to said servo-motor controlling means.

45. In an automatic pilot for dirigible craft, the combination of a rudder, direction responsive means, a pair of air ports mounted adjacent thereto and adapted to provide parallel air streams in the same direction, an intercepting plate connected to said direction responsive means adjacent but out of contact with said ports and rotatable in a plane at right angles to said ports, differential pressure responsive means controlled by said ports and so arranged that upon actuation thereof said ports are caused to follow the movements of said intercepting plate, a servo-motor for actuating the rudder, means actuated by said differential pressure responsive means for controlling said servo-motor, and a follow-up connection from said rudder to said servo-motor controlling means and means for modifying the action of said differential pressure responsive means on said servo-motor controlling means in accordance with the rate of deviation of the craft and in accordance with the acceleration of said craft, whereby said rudder is actuated as a function of the amount, rate and acceleration of deviation of said craft.

46. An automatic control system for a dirigible craft, comprising a control surface for controlling said craft with respect to a desired axis, means responsive to the deviation of said craft about said axis, electromechanical means controlled by said deviation responsive means producing a force proportional to the rate of deviation, and mechanical means controlled by said deviation responsive means for producing a force proportional to the values of acceleration of deviation about said axis, said means controlling said surface.

47. An automatic control system for a dirigible craft comprising a control surface for controlling said craft with respect to a desired axis, means responsive to the deviation of said craft about said axis, mechanical means controlled by said deviation responsive means for producing a force proportional to the rate of deviation and mechanical means controlled by said deviation responsive means producing a force proportional to all values of acceleration of deviaiton about said axis, said means controlling said surface.

48. An automatic control system for a dirigible craft comprising a control surface, a reference measuring apparatus, means responsive to the amplitude of deviations of the craft from a state of equilibrium relative to a given axis thereof registered by said measuring apparatus, and mechanical means controlled by said deviation responsive means for producing a force proportional to all values of the acceleration of deviation, said deviation responsive means and said acceleration means controlling said surface.

49. An automatic control system for a dirigible craft comprising a control surface, a reference measuring apparatus, means responsive to the amplitude of deviations of the craft from a state of equilibrium relative to a given axis thereof, registered by said measuring apparatus, electromechanical means for deriving from said amplitude responsive means the first differential of said deviation, mechanical means for deriving from said amplitude responsive means the second differential of said deviation, and means responsive to said deviation means and said first and second differential means for controlling said surface.

50. An automatic control system for dirigible craft comprising a control surface, a reference measuring apparatus, means responsive to amplitude of deviation of the craft from a state of equilibrium relative to a given axis thereof, registered by said measuring apparatus, mechanical means for deriving from said amplitude responsive means the first differential of said deviation, mechanical means for producing a force proportional to the second differential of said deviation, and means responsive to said deviation means, said first differential means and said second differential means for controlling said surface.

51. An automatic control system for dirigible craft comprising a control surface, a reference measuring apparatus, means responsive to the amplitude of deviations of the craft from a state of equilibrium relative to a given axis thereof, registered by said measuring apparatus, mechanical means for deriving from said amplitude responsive means the second differential of all values of said deviation, and means responsive to said deviation means and to said second differential means for controlling said surface.

52. A repeating system, comprising a sensitive indicator, follow-up means for said indicator, means repeating the movement of said follow-up means, and means measuring the lag between said follow-up means and said indicator for modifying the movement of said repeating means.

53. In combination, a reference measuring device, follow-up means for said device, means repeating the positions of said follow-up means, and means measuring the lag between said follow-up means and said measuring device for applying to said repeating means a correction to thereby produce synchronism between said means and said measuring device.

54. In combination, a reference measuring device, follow-up means for said device, means repeating the positions of said follow-up means, and means producing an effect proportional to the rate of change in lag between said follow-up means and said measuring device for applying a correction to said repeating means to decrease the lag between said repeating means and said measuring device.

55. In combination, a reference measuring device, follow-up means for said device, means repeating the positions of said follow-up means, and means producing an effect proportional to the rate of change of lag between said follow-up means and said measuring device for applying a correction to said repeating means to decrease the lag between said repeating means and said measuring device.

56. In combination, a reference measuring device, follow-up means for said device, means repeating the position of said follow-up means and means producing an effect proportional to the rate of change of lag and to the differential of said rate of change of lag between said follow-up means and said measuring device for applying a correction to said repeating means to decrease the lag between said repeating means and said measuring device.

57. In combination, a reference measuring device, follow-up means for said device, means repeating the positions of said follow-up means, and means producing an effect proportional to the lag and to the rate of change of lag between said follow-up means and said measuring device for applying a correction to said repeating means to decrease the lag between said repeating means and said measuring device.

58. In combination, a reference measuring device, follow-up means for said device, means repeating the position of said follow-up means, and means producing an effect proportional to the lag and to the second differential of lag between said follow-up means and said measuring device for applying a correction to said repeating means to decrease the lag between said repeating means and said measuring device.

59. In combination, a reference measuring device, follow-up means for said device, means repeating the positions of said follow-up means, and means producing an effect proportional to the lag, the first differential of said lag and the second differential of said lag between said follow-up means and said measuring device for applying a correction to said repeating means to decrease the lag between said means and said measuring device.

60. In combination, a reference measuring device, follow-up means for said device, means measuring the lag between said follow-up means and said measuring device, and means controlled by said measuring means for modifying the effect of said follow-up means.

61. In combination, a reference measuring device, follow-up means for said device, means artificially controlling the lag between said follow-up means and said device, means measuring said lag and means controlled by said measuring means for modifying the effect of said follow-up means.

62. In combination, a reference measuring device, follow-up means for said device and means producing an effect proportional to the rate of change of lag between said follow-up means and said measuring device for modifying the effect of said follow-up means.

63. In combination, a reference measuring device, follow-up means for said device and means producing an effect proportional to the second differential of the lag between said follow-up means and said measuring device for modifying the effect of said follow-up means.

64. In combination, a reference measuring device, follow-up means for said device, means artificially controlling the lag between said follow-up means and said device, means measuring the rate of change of lag and the second differential of lag between said follow-up means and said device, and means controlled by said measuring means for modifying the effect of said follow-up means.

ROBERT ALKAN.

Disclaimer 2,259,600.—*Robert Alkan*, Paris, France. AUTOMATIC STABILIZING ARRANGEMENT FOR AIRCRAFT. Patent dated Oct. 21, 1941. Disclaimer filed Oct. 6, 1948, by the inventor.

Hereby enters this disclaimer of claims 27, 30, 60, 62, and 63 of said patent.

[*Official Gazette November 2, 1948.*]